(12) United States Patent
Yamaguchi

(10) Patent No.: US 11,573,425 B2
(45) Date of Patent: Feb. 7, 2023

(54) OPTICAL MODULE AND HEAD-MOUNTED DISPLAY DEVICE

(71) Applicant: SEIKO EPSON CORPORATION, Tokyo (JP)

(72) Inventor: Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/680,178

(22) Filed: Feb. 24, 2022

(65) Prior Publication Data

US 2022/0276491 A1  Sep. 1, 2022

(30) Foreign Application Priority Data

Feb. 26, 2021 (JP) .............................. JP2021-029755

(51) Int. Cl.
*G02B 27/01* (2006.01)

(52) U.S. Cl.
CPC ..... *G02B 27/0172* (2013.01); *G02B 27/0176* (2013.01); *G02B 2027/0138* (2013.01); *G02B 2027/0178* (2013.01)

(58) Field of Classification Search
CPC ............ G02B 27/0172; G02B 27/0176; G02B 2027/0138; G02B 2027/0178
See application file for complete search history.

(56) References Cited

U.S. PATENT DOCUMENTS

| 2009/0168131 | A1 | 7/2009 | Yamaguchi et al. |
| 2015/0177520 | A1* | 6/2015 | Hiraide ............... G02B 27/0176 359/507 |
| 2015/0185483 | A1* | 7/2015 | Hiraide .................. G02B 27/01 174/70 C |
| 2017/0212378 | A1* | 7/2017 | Haruyama ........ G02F 1/133634 |
| 2017/0235147 | A1* | 8/2017 | Kamakura ............. G02C 5/126 359/630 |
| 2020/0310139 | A1 | 10/2020 | Takagi et al. |

FOREIGN PATENT DOCUMENTS

| CN | 107526168 A | * 12/2017 | ......... G02B 27/0172 |
| CN | 108089329 A | * 5/2018 | |
| CN | 112630972 A | * 4/2021 | ......... G02B 27/0176 |
| JP | 2009157290 | 7/2009 | |
| JP | 2009157291 | 7/2009 | |
| JP | 2020160115 | 10/2020 | |

* cited by examiner

*Primary Examiner* — Ricardo Osorio
(74) *Attorney, Agent, or Firm* — JCIPRNET

(57) ABSTRACT

An optical module includes an image element, a projection lens, a prism mirror, a wedge type optical element, a barrel configured to support the prism mirror and the wedge type optical element, a first combiner configured to deflect image light emitted from the wedge type optical element, a first dust proof member configured to cover a both end region of the projection lens, the prism mirror, and the barrel in a third axis, and cover an end region of the projection lens and the prism mirror located on the prism mirror side in a second axis, and a second dust proof member provided between the projection lens and the barrel.

11 Claims, 15 Drawing Sheets

OPTICAL MODULE AND HEAD-MOUNTED DISPLAY DEVICE

The present application is based on, and claims priority from JP Application Serial Number 2021-029755, filed Feb. 26, 2021, the disclosure of which is hereby incorporated by reference herein in its entirety.

BACKGROUND

1. Technical Field

The present disclosure relates to an optical module that enables observation of a virtual image and a head-mounted display device including the optical module.

2. Related Art

In an optical module, etc. that enables observation of a virtual image, for the purpose of ensuring dust-proofing and water-proofing for an internal optical system, it is disclosed that a housing covers a unit accommodating an optical member such as a display element and a lens, and a packing is provided between an externally exposed light-guiding member and the housing (JP-A-2009-157291).

In the optical module of JP-A-2009-157291 described above, when the unit that accommodates the optical member, etc. is dust-proof, the unit increases in size, and the size of the housing that accommodates the unit is increased. Note that when the unit that accommodates the optical member, etc. is not dust-proof, the housing that accommodates the unit needs to be dust-proof or water-proof, and the housing increases in size.

SUMMARY

An optical module or a head-mounted display device according to an aspect of the present disclosure includes a an image element that emits an image light; a first optical member that includes: a first incident portion on which the image light is incident, and a first emission portion that emits the image light along a first direction; a second optical member that includes: a second incident portion on which the image light from the first optical member is incident, a second emission portion that emits the image light along a second direction intersecting the first direction, and a reflection portion that reflects the image light from the second incident portion toward the second emission portion; a third optical member that includes: a third incident portion on which the image light from the second optical member is incident, and a third emission portion that emits the image light; a support member that supports the second optical member and the third optical member; a combiner that reflects the image light from the third optical member toward a position of a pupil; a first dust proof member that covers a region of the first optical member, a region of the second optical member, and a region of the support member in a third direction intersecting the first direction and the second direction, and covers a region of the first optical member and a region of the second optical member in the second direction; and a second dust proof member provided between the first optical member and the support member.

DESCRIPTION OF EXEMPLARY EMBODIMENTS

Hereinafter, an exemplary embodiment of an optical module and a head-mounted display device according to the present disclosure will be described with reference to the accompanying drawings.

Figure 1:
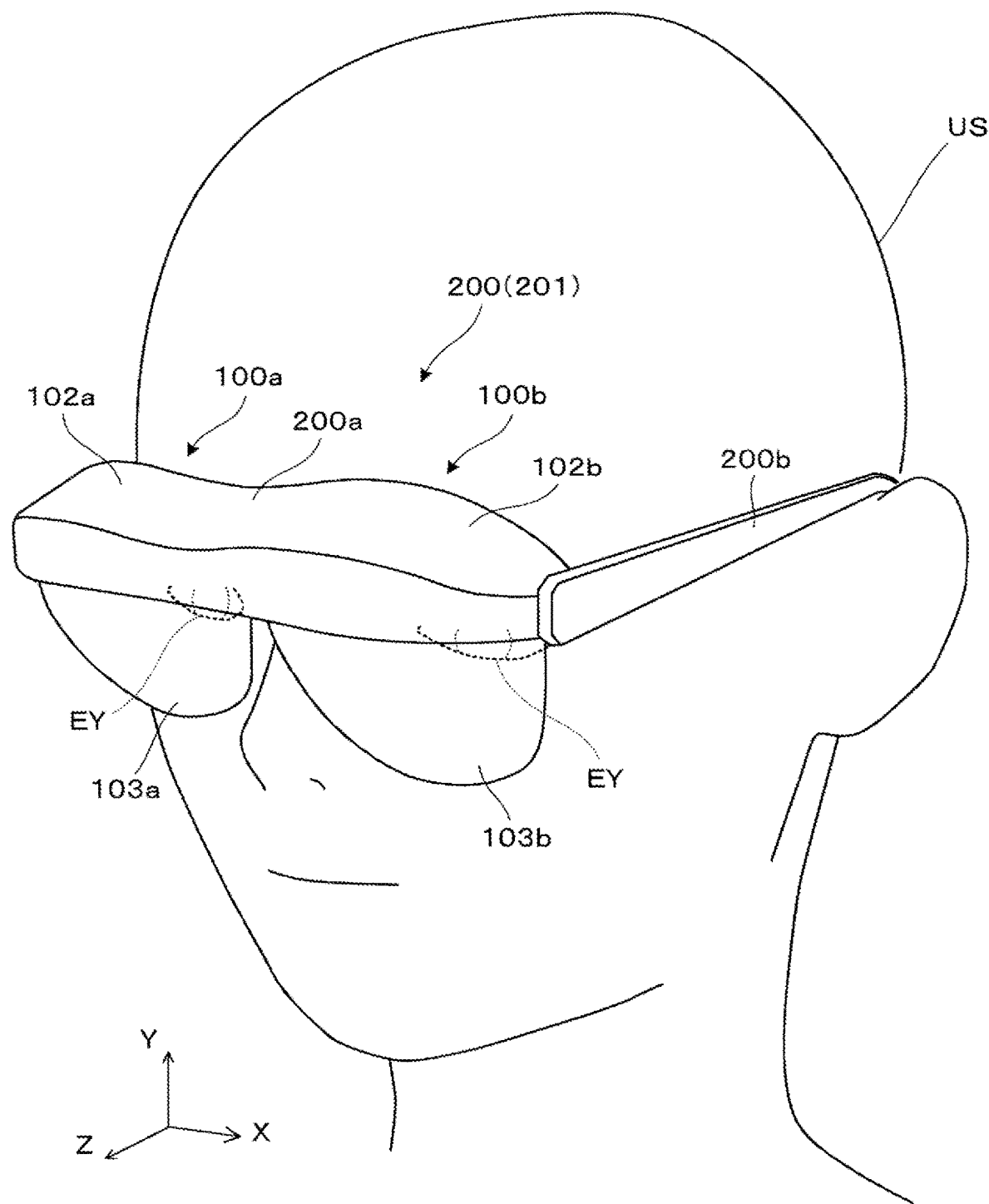
FIG. 1 is an external perspective view illustrating a mounting state of a HMD of an exemplary embodiment.

FIG. 1 is a view illustrating a mounting state of an image display device 200. The image display device 200 is a head-mounted display device or a head-mounted display (hereinafter, also referred to as HMD) 201, and causes an observer or a wearer US who wears the image display device 200 to recognize an image as a virtual image. In FIG. 1, etc., X, Y, and Z are an orthogonal coordinate system, a +X direction corresponds to a horizontal direction in which the two eyes EY of the observer or wearer US wearing the image display device 200 or the HMD201 are aligned, a +Y direction corresponds to an upward direction orthogonal to the horizontal direction in which the two eyes EY of the wearer US are aligned, and a +Z direction corresponds to a direction to a front or a forward direction for the wearer US. A ±Y direction is parallel to a vertical axis or a vertical direction.

The image display device 200 includes a main body 200*a* disposed to cover the front of the wearer US and a pair of temple support devices 200*b* that support the main body 200*a*. The main body 200*a*, when functionally viewed, includes a first display device 100*a* for the right eye and a second display device 100*b* for the left eye. The first display device 100*a* includes a first display driving unit 102*a* disposed at an upper portion thereof, and a first combiner 103*a* that is shaped like a spectacle lens and covers the front of the eye. Similarly, the second display device 100*b* includes a second display driving unit 102b disposed at an upper portion thereof, and a second combiner 103b that is shaped like a spectacle lens and covers the front of the eye.

Figure 2:
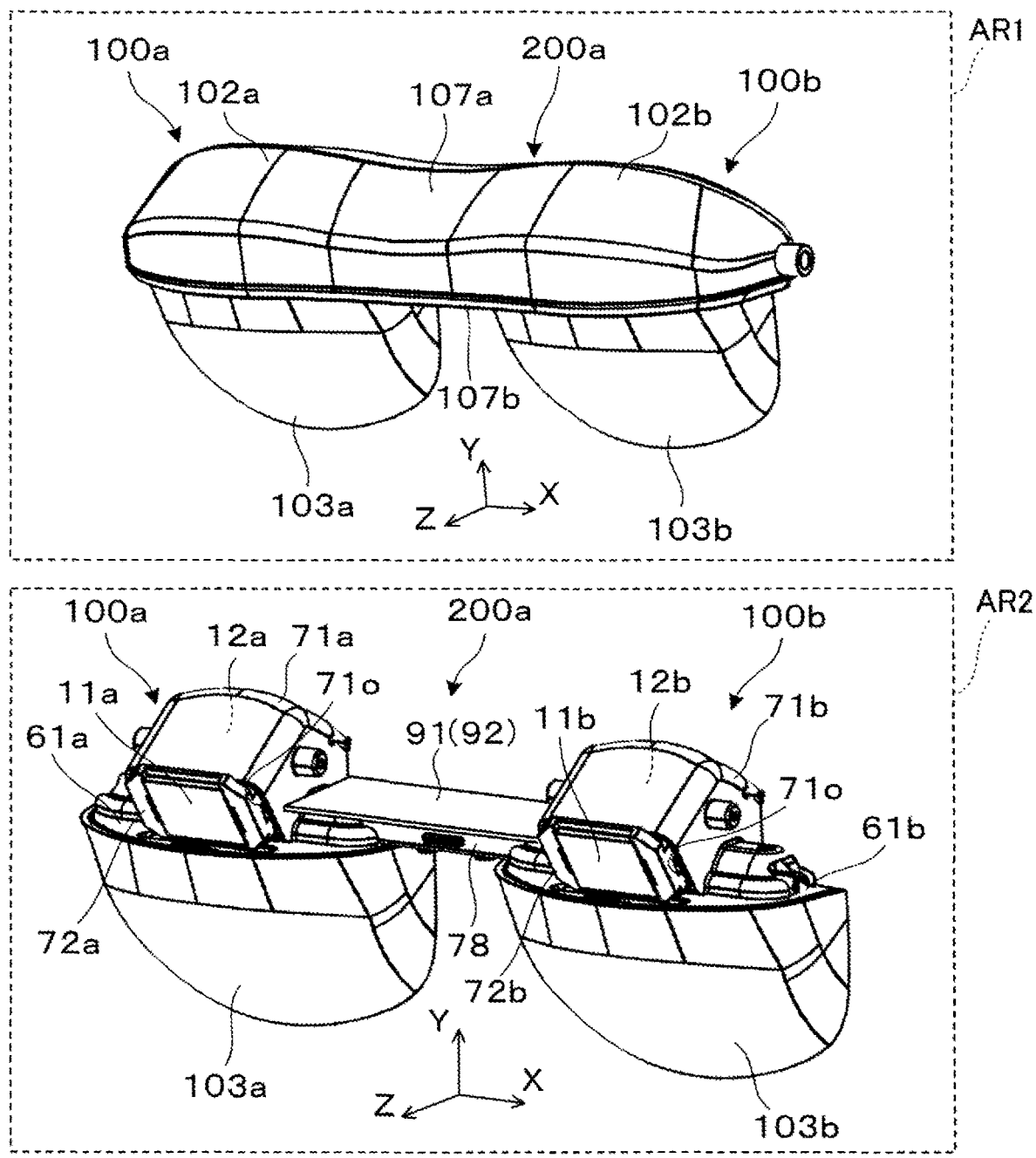
FIG. 2 illustrates a perspective view of a main body of the HMD and a perspective view of the interior with an exterior member removed.

The structure, etc. of the main body 200a of the image display device 200 illustrated in FIG. 1 will be described with reference to FIG. 2. In FIG. 2, a region AR1 is an external perspective view of the main body 200a, and a region AR2 is a perspective view with a top portion of the main body 200a exposed.

A pair of the display driving units 102a, 102b disposed on the +Y side or the upper side of the main body 200a are coupled and integrated, and are covered by a dome-shaped upper exterior member 107a elongated in the horizontal direction and a flat plate-shaped lower exterior member 107b. The first combiner 103a and the second combiner 103b have a shape such that an upper portion of a hemisphere protruding in the forward or the +Z direction is cut, and is disposed so as to protrude downward from the lower exterior member 107b.

The first display device 100a for the right eye includes a first image element 11a, a first optical system 12a, a first frame 61a, and the first combiner 103a. The first optical system 12a is covered with a first cover member 71a, which is an inner cover. The first image element 11a is disposed so as to close an opening 71o of the first cover member 71a, and is fixed to the first optical system 12a via a first holder 72a having a rectangular frame shape.

The second display device 100b for the left eye includes a second image element 11b, a second optical system 12b, a second frame 61b, and the second combiner 103b. The second optical system 12b is covered with a second cover member 71b, which is an inner cover. The second image element 11b is disposed so as to close the opening 71o of the second cover member 71b, and is fixed to the second optical system 12b via the second holder 72b having a rectangular frame shape. The second display device 100b for the left eye has the same structure and function as the first display device 100a for the right eye. In other words, the second image element 11b is the same as the first image element 11a, the second optical system 12b is the same as the first optical system 12a, and the second combiner 103b is the same as the first combiner 103a.

The first display device 100a and the second display device 100b are coupled and fixed via a fixing member 78 therebetween. In other words, the fixing member 78 supports a pair of the frames 61a, 61b integrated into the pair of display devices 100a, 100b, and maintains a state in which the first display device 100a and the second display device 100b are relatively positioned. Specifically, the first frame 61a is coupled to one end of the rod-shaped fixing member 78 at the inner end near the second frame 61b, and the second frame 61b is coupled to the other end of the rod-shaped fixing member 78 at the inner end near the first frame 61a. The first frame 61a and the second frame 61b are semi-circular plate-shaped metal members, and are formed, for example, from a magnesium alloy. The fixing member 78 is also formed from, for example, a magnesium alloy. By forming the first frame 61a and the second frame 61b from a highly heat dissipating material such as a magnesium alloy, heat dissipation efficiency of heat generated by the image element 11a, etc. can be increased. Additionally, by forming the fixing member 78 from a highly heat dissipating material such as a magnesium alloy, the first frame 61a and the second frame 61b can be cooled by heat dissipation.

A rectangular plate-shaped circuit board 91 is disposed above the fixing member 78 between the left and right display devices 100a, 100b. The circuit board 91 includes a control device 92 that controls display operation of the first image element 11a and the second image element 11b. The control device 92 outputs a drive signal corresponding to the display image to the left and right image elements 11a, 11b to control the display operation of the left and right image elements 11a, 11b. The control device 92 includes, for example, an IF circuit, a signal processing circuit, etc., and causes the left and right image elements 11a, 11b to display a two-dimensional image according to the image data or the image signal received from the outside. Although not shown, the control device 92 includes a main board that controls the operation of the first display device 100a and the operation of the second display device 100b. The main board may have, for example, an interface function that communicates with an external device (not shown) and performs signal conversion on a signal received from the external device, and an integrated function that links the display operation of the first display device 100a and the display operation of the second display device 100b.

Figure 3:
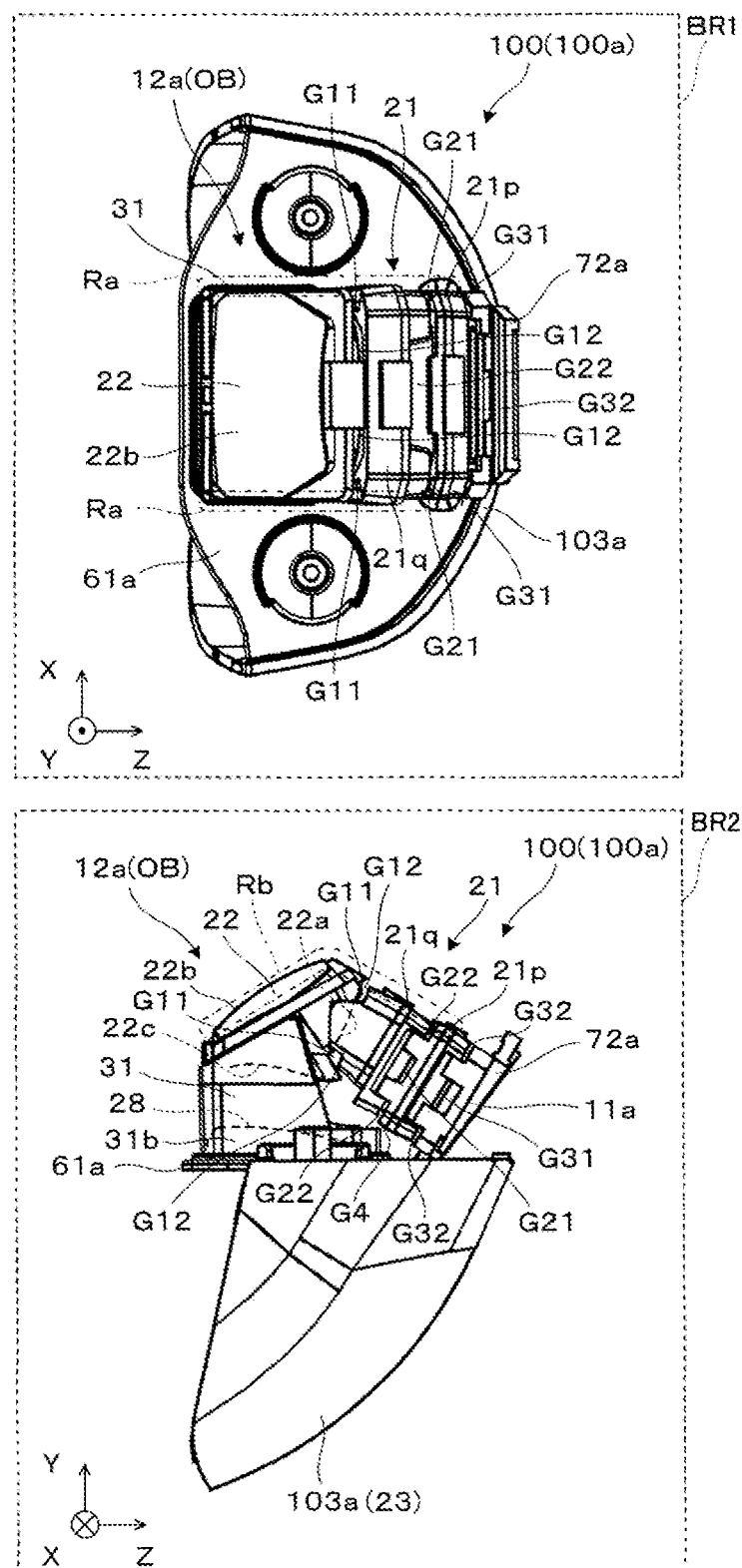
FIG. 3 illustrates a top view and a left side view of an optical module.

FIG. 3 illustrates an optical module 100 constituting the first display device 100a. In FIG. 3, a region BR1 is a top view of the optical module 100 and a region BR2 is a side view of the optical module 100. The first optical system 12a is fixed to an upper surface of the plate-shaped first frame 61a by adhesion, etc., and the first combiner 103a is fixed to the front half of the periphery of the first frame 61a by adhesion, etc. at an upper end thereof. In the first optical system 12a, a prism mirror 22, which is a second optical member, and a wedge type optical element 28, which is a third optical member, are separated in the vertical or ±Y direction, and fixed in a mutually positioned state via a barrel 31 which is a support member. A projection lens 21, which is a first optical member, is supported and fixed to the prism mirror 22 on the rear side, that is, on the −Z side. The first optical system 12a is a component integrated in a state in which the first optical member to the third optical member are positioned, and is hereinafter also referred to as optical block OB. Of the optical block OB, the projection lens 21 supports the first image element 11a via the first holder 72a at an end on the opposite side of the prism mirror 22. The wedge type optical element 28 is fixed to the first frame 61a. In other words, the optical block OB is fixed to the first frame 61a via the wedge type optical element 28.

Figure 4:
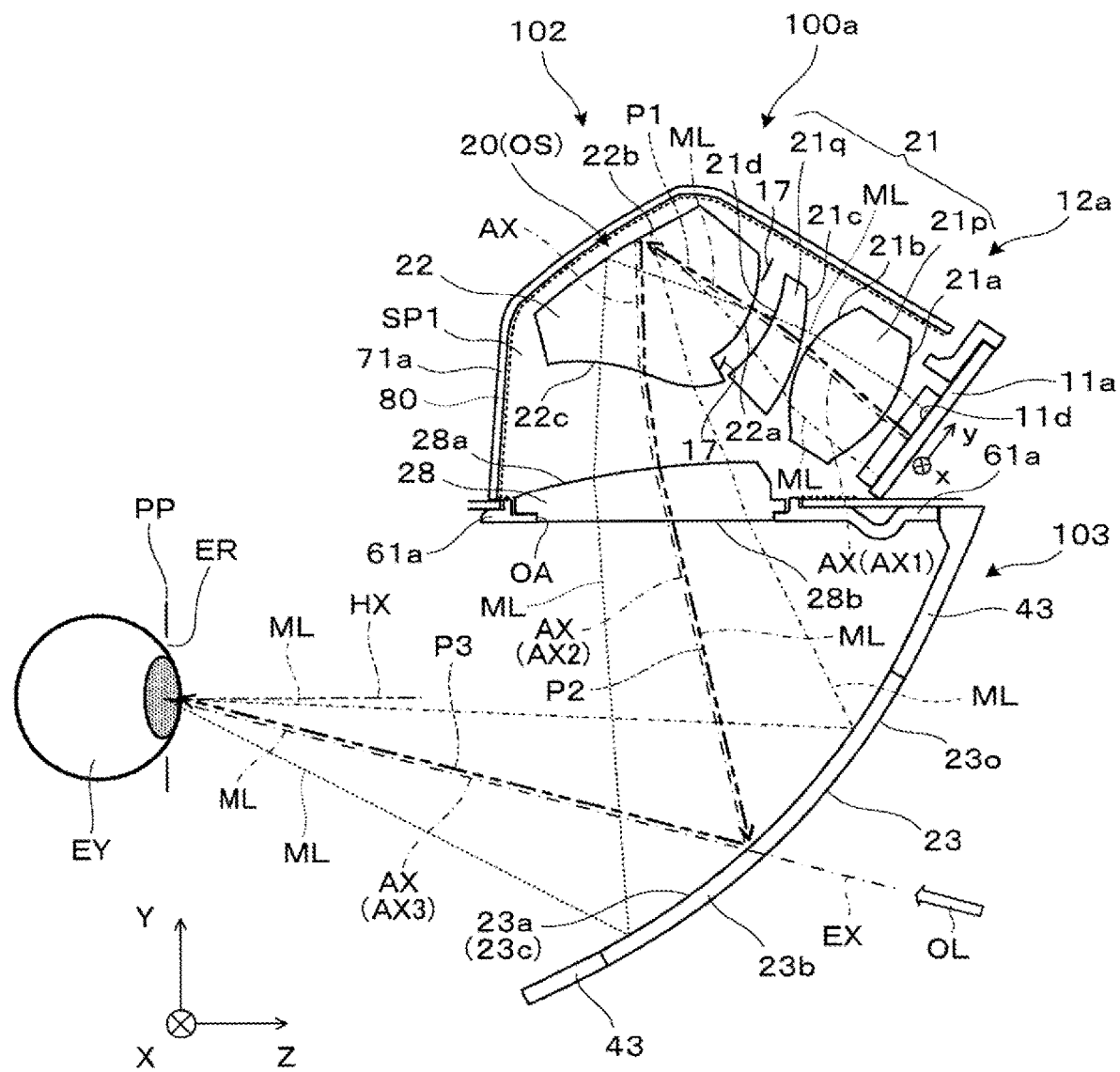
FIG. 4 is an conceptual side cross-sectional view illustrating an optical system within the HMD.

FIG. 4 is a side cross-sectional view illustrating an optical structure of the first display device 100a. The first display device 100a includes the first image element 11a and an imaging optical system 20. The imaging optical system 20 includes the projection lens 21, the prism mirror 22, the wedge type optical element 28, and a see-through mirror 23. The projection lens 21, the prism mirror 22, and the wedge type optical element 28 of the imaging optical system 20 correspond to the first optical system 12a illustrated in FIG. 3, etc., and the see-through mirror 23 corresponds to the first combiner 103a. The main body of the first image element 11a, the projection lens 21, and the prism mirror 22 are accommodated in a space SP1 sandwiched between the first cover member 71a and the first frame 61a. The wedge type optical element 28 is disposed so as to be fitted into a step formed at the optical aperture OA of the first frame 61a, and the periphery of the optical aperture OA is kept airtight state.

The first image element 11a is a spontaneous light emission type display device. The first image element 11a is, for example, an organic EL (Organic Electro-luminescence) display, and forms a color still image or moving image on a two-dimensional display surface 11d. The first image element 11a is disposed along an x-y plane that is inclined by being slightly rotated about the X axis with respect to an X-Y plane. The first image element 11a is driven by the circuit board 91 to perform display operation. Without being limited to the organic EL display, the first image element 11a can be replaced with a micro LED display or a display device using an inorganic EL, an organic LED, a laser array, a quantum dot light emitting element, etc. Without being limited to a spontaneous light emission type imaging light generation device, the first image element 11a may include an LCD and another light modulation element, and may form an image by illuminating the light modulation element with a light source such as a backlight. As the first image element 11a, a LCOS (Liquid crystal on silicon, LCoS is a registered trademark), a digital micro-mirror device, etc. may be used instead of an LCD.

The projection lens 21 includes a first lens 21p and a second lens 21q. The first lens 21p includes an incident portion 21a and an emission portion 21b, and the second lens 21q includes an incident portion 21c and an emission portion 21d. Of these surfaces, the incident portion 21a and the emission portion 21d correspond to a first incident portion and a first emission portion of the projection lens 21, which is the first optical member. The projection lens 21 receives image light ML emitted from the first image element 11a and causes the image light ML to be incident on the prism mirror 22. The projection lens 21 focuses the image light ML emitted from the first image element 11a into a state close to a parallel luminous flux. The prism mirror 22 has an incident portion 22a, a reflection portion 22b, and an emission portion 22c. Of these surfaces, the incident portion 22a and the emission portion 22c correspond to a second incident portion and a second emission portion of the prism mirror 22, which is the second optical member. The prism mirror 22 emits the image light ML incident from the front such that it is bent in a direction inclined with respect to a direction in which an incident direction is reversed (a direction of the light source seen from the prism mirror 22). The wedge type optical element 28 has an incident portion 28a and an emission portion 28b, and passes the image light ML emitted from the prism mirror 22 toward the see-through mirror 23. The incident portion 28a and the emission portion 28b correspond to a third incident portion and a third emission portion of the wedge type optical element 28, which is the third optical member. The see-through mirror 23 has a reflection portion 23a and an outer surface 23o. The see-through mirror 23 enlarges an intermediate image formed on the light emission side of the prism mirror 22.

The imaging optical system 20 is an off-axis optical system OS due to the see-through mirror 23 being a concave mirror, etc. In the case of the present embodiment, the projection lens 21, the prism mirror 22, and the see-through mirror 23 are disposed to be non-axially symmetrical and have an optical surface that is non-axisymmetric. The fact that the imaging optical system 20 is an off-axis optical system OS means that, in the optical elements 21, 22, 28, 23 constituting the imaging optical system 20, the optical path as a whole is bent before and after the light beam is incident on the plurality of reflection portions or refracting surfaces. In the imaging optical system 20, that is, the off-axis optical system OS, an optical axis AX is bent so that the optical axis AX extends along an off-axis surface (a surface parallel to the Y-Z surface) corresponding to a plane of the drawing, and the optical elements 21, 22, 28, 23 are arranged along the off-axis surface. When viewed in a cross section parallel to the Y-Z plane, the optical axis AX is arranged in a Z shape by a plurality of optical axis portions AX1, AX2, AX3 that are inclined to each other in front of and behind the reflection portion. In other words, in the off-axis surface parallel to the Y-Z plane, an optical path P1 from the projection lens 21 to an reflection portion 22b, an optical path P2 from the reflection portion 22b to the see-through mirror 23, and an optical path P3 from the see-through mirror 23 to the pupil position PP are arranged to be bent in a Z shape in two stages. The off-axis surface (the surface parallel to the Y-Z plane) which is a reference surface extends parallel to the Y direction which is a longitudinal direction. In this case, the optical elements 21, 22, 28, 23 constituting the first display device 100a are arranged so that height positions thereof are changed in the longitudinal direction, and an increase in a transverse width of the first display device 100a can be prevented.

In the imaging optical system 20, the optical path P1 from the projection lens 21 to the reflection portion 22b extends obliquely upward toward the rear. That is, in the optical path P1, the optical axis portion AX1 extends in a direction near the intermediate between the −Z direction and the +Y direction. The optical path P2 from the reflection portion 22b to the see-through mirror 23 extends obliquely downward toward the front. That is, in the optical path P2, the optical axis portion AX2 extends in a direction near the intermediate between the +Z direction and the −Y direction. However, with respect to the water surface direction (X-Z plane), the inclination of the optical path P2 is greater than the inclination of the optical path P1. Thus, the image light ML emitted from the projection lens 21 in a first direction parallel to the optical axis portion AX1 is incident on the incident portion (second incident portion) 22a of the prism mirror 22, and the reflection portion 22b of the prism mirror 22 reflects the incident image light ML in a second direction parallel to the optical axis portion AX2 and intersecting with the first direction. The optical path P3 from the see-through mirror 23 to the pupil position PP is in a state of being nearly parallel to the Z direction, but in the illustrated example, the optical axis portion AX3 is approximately −10° in the +Z direction with the downward direction being negative. That is, an emission optical axis EX which is an extension of the optical axis portion AX3 is inclined downward by approximately 10° with respect to a central axis HX parallel to the front +Z direction. This is because a line of sight of a human being is stable in a slightly lowered eye state in which the line of sight is inclined downward by approximately 10° with respect to a horizontal direction.

The incident portion 21a and the emission portion 21b of the first lens 21p constituting the projection lens (first optical member) 21 have asymmetry in the longitudinal direction parallel to the Y-Z plane and intersecting the optical axis AX with the optical axis AX interposed therebetween, and have symmetry in the horizontal direction or the X direction with the optical axis AX interposed therebetween. The incident portion 21c and the emission portion 21d of the second lens 21q constituting the projection lens 21 have asymmetry in the longitudinal direction parallel to the Y-Z plane and intersecting the optical axis AX with the optical axis AX interposed therebetween, and have symmetry in the horizontal direction or the X direction with the optical axis AX interposed therebetween. The first lens 21p and the second lens 21q are formed of, for example, a resin. The incident portion 21a and the emission portion 21b of the first lens 21p are, for example, free-form surfaces, but may be aspherical surfaces. The incident portion 21c and the emission portion 21d of the second lens 21q are, for example, free-form surfaces, but may be aspherical surfaces. The optical performance of the eccentric system can be easily improved by setting the incident portions 21a, 21c or the emission portions 21*b*, 21*d* to be free-form surfaces, whereby an aberration of the imaging optical system 20 which is the non-coaxial off-axis optical system OS can be easily reduced. Although detailed illustration is omitted, an antireflection film is formed at the incident portions 21*a*, 21*c* and the emission portions 21*b*, 21*d*.

The prism mirror (second optical member) 22 is a refractive reflection optical member having a function of combining a mirror and a lens, and reflects the image light ML from the projection lens 21 while refracting it. The prism mirror 22 causes the image light ML to enter the interior via the incident portion 22*a*, totally reflect the incident image light ML in the non-front direction by the reflection portion 22*b*, and causes the incident image light ML to emit to the outside via the emission portion 22*c*. The incident portion 22*a* and the emission portion 22*c* are optical surfaces formed of curved surfaces, and contribute to resolution improvement compared to a case in which they are only the reflection portions or they are flat surfaces. The incident portion 22*a*, the reflection portion 22*b*, and the emission portion 22*c* which are the optical surfaces constituting the prism mirror 22 have asymmetry in the longitudinal direction parallel to the Y-Z plane and intersecting the optical axis AX with the optical axis AX interposed therebetween, and have symmetry in the horizontal direction or the X direction with the optical axis AX interposed therebetween. The prism mirror 22 is formed of, for example, a resin. A refractive index of a main body of the prism mirror 22 is set to a value such that total reflection on the inner surface is achieved in consideration of a reflection angle of the image light ML. The optical surface of the prism mirror 22, that is, the incident portion 22*a*, the reflection portion 22*b*, and the emission portion 22*c* are, for example, free-form surfaces, but may be aspherical surfaces. In the prism mirror 22, the optical performance of the eccentric system can be easily improved by setting the optical surfaces 22*a*, 22*b*, 22*c* to be free-form surfaces. The reflection portion 22*b* is not limited to one that reflects the image light ML by total reflection, and may be a reflection portion formed of a metal film or a dielectric multilayer film. In this case, a reflection film formed of a single layer film or multilayer film formed of a metal such as Al or Ag is formed at the reflection portion 22*b* by vapor deposition, etc., or a sheet-shaped reflection film formed of a metal is affixed thereto. Although detailed illustration is omitted, an antireflection film is formed at the incident portion 22*a* and the emission portion 22*c*.

A light blocking member 17 is disposed between the prism mirror 22 and the projection lens 21. The light blocking member 17 is disposed at a position close to the aperture pupil in which the image light ML is drawn as a whole. However, since the imaging optical system 20 is an off-axis optical system OS, the position of the aperture pupil differs with respect to the X direction of the vertical Y direction or the horizontal direction, and it is not an aperture stop in a strict sense. The light blocking member 17 is supported around one of the incident portion 22*a* of the prism mirror 22 and the emission portion 21*d* of the projection lens 21.

The wedge type optical element 28 is disposed between the prism mirror 22 and the see-through mirror 23, and has optical transparency. The wedge type optical element 28 has a role in improving an imaging state. The incident portion 28*a* of the wedge type optical element 28 is flat but has a free-form surface, has asymmetry in the longitudinal direction parallel to the Y-Z plane with the optical axis AX interposed therebetween, and has symmetry in the X direction or the horizontal direction perpendicular to the Y-Z plane with the optical axis AX interposed therebetween. The wedge type optical element 28 is formed of, for example, a resin. An antireflection film is formed at the incident portion 28*a*. The emission portion 28*b* of the wedge type optical element 28 is a flat surface, and an antireflective coating is formed. The wedge type optical element 28 increases in thickness on the +Z side, which is the front side. As a result, distortion aberration caused by the prism mirror 22, etc. can be suppressed. The refractive index of the wedge type optical element 28 is different from the refractive index of the prism mirror 22. As a result, the degree of refraction and dispersion can be adjusted between the wedge type optical element 28 and the prism mirror 22, etc., which facilitates achieving color cancellation, for example.

The see-through mirror 23 is a curved plate-shaped optical member that serves as a concave surface mirror, and reflects the image light ML from the prism mirror 22 toward the pupil position PP. In other words, the see-through mirror 23 that forms the first combiner 103*a* deflects the image light ML emitted from the wedge type optical element 28, which is the third optical member, to form an exit pupil ER. The see-through mirror 23 covers the pupil position PP at which the eye EY or the pupil is disposed, has a concave shape toward the pupil position PP, and has a convex shape toward the outside. The see-through mirror 23 is a concave transmission mirror that covers the entire effective region of a screen in the view. The see-through mirror 23 is a collimator having a convergence function, and reflects the main ray of the image light ML temporarily spread by imaging in the vicinity of the emission region of the first optical system 12*a*, which is the main ray of the image light ML emitted from each of points on the display surface 11*d*, toward the pupil position PP and converges them at the pupil position PP. The see-through mirror 23 is a mirror plate having a structure in which a mirror film 23*c* having transmissive properties is formed at a front surface or a back surface of a plate-shaped body 23*b*. The see-through mirror 23 and the reflection portion 23*a* have asymmetry in the longitudinal direction parallel to the Y-Z plane and intersecting the optical axis AX with the optical axis AX interposed therebetween, and have symmetry in the horizontal direction or the X direction with the optical axis AX interposed therebetween. The reflection portion 23*a* of the see-through mirror 23 is, for example, a free-form surface, but may be an aspherical surface. The aberration reduction can be achieved by setting the reflection portion 23*a* of the see-through mirror 23 to be a free-form surface or an aspherical surface, and, in particular, when a free-form surface is used, the aberration of the imaging optical system 20 which is an off-axis optical system or a non-coaxial optical system can be easily reduced.

The see-through mirror 23 is a transmissive type reflection element that allows transmission of some of light upon reflection, and the reflection portion 23*a* or the mirror film 23*c* of the see-through mirror 23 is formed by a reflection layer having a semi-transmissive property. Thus, because outside light OL passes through the see-through mirror 23, see-through view of the outside is enabled, and a virtual image can be superimposed on an outside image. At this time, when the plate-shaped body 23*b* that supports the mirror film 23*c* has a thickness of less than or equal to approximately a few millimeters, a change in the magnification of the outside image can be suppressed to be small. A reflectance of the mirror film 23*c* with respect to the image light ML and the outside light OL shall be 10% or greater and 50% or less in a range of an incident angle of the assumed image light ML from the viewpoint of ensuring the brightness of the image light ML and facilitating the observation of the outside image by see-through, The plate-shaped body 23b which is a base material of the see-through mirror 23 is formed of, for example, a resin, and may also be formed of glass. The plate-shaped body 23b is formed of the same material as the support plate 43 that supports the plate-shaped body 23b from the surroundings thereof, and has the same thickness as the support plate 43. The mirror film 23c is formed of, for example, a dielectric multilayer film configured of a plurality of dielectric layers having an adjusted film thickness. The mirror film 23c may be a single-layer film or a multilayer film of a metal such as Al or Ag of which a film thickness has been adjusted. The mirror film 23c may be formed by laminating, and may also be formed by affixing a sheet-shaped reflection film. An antireflection film is formed on an outer surface 23o of the plate-shaped body 23b.

In describing the optical path, the image light ML from the first image element 11a is emitted in a state of being incidentally incident on the projection lens 21 and is substantially collimated. The image light ML that has passed through the projection lens 21 is incident on the prism mirror 22, passes through the incident portion 22a while being refracted by it, is reflected by the reflection portion 22b with a high reflectance close to 100%, and is refracted by the emission portion 22c. The image light ML from the prism mirror 22 is incident on the see-through mirror 23 via the wedge type optical element 28, and is reflected by the reflection portion 23a with a reflectance of about 50% or less. The image light ML reflected by the see-through mirror 23 is incident on the pupil position PP at which the eye EY or pupil of the wearer US is placed. The outside light OL that has passed through the see-through mirror 23 and a support plate 43 therearound is also incident on the pupil position PP. In other words, the wearer US wearing the first display device 100a can observe a virtual image of the image light ML in a state in which the imaging light ML overlaps with the outside image.

Figure 5:
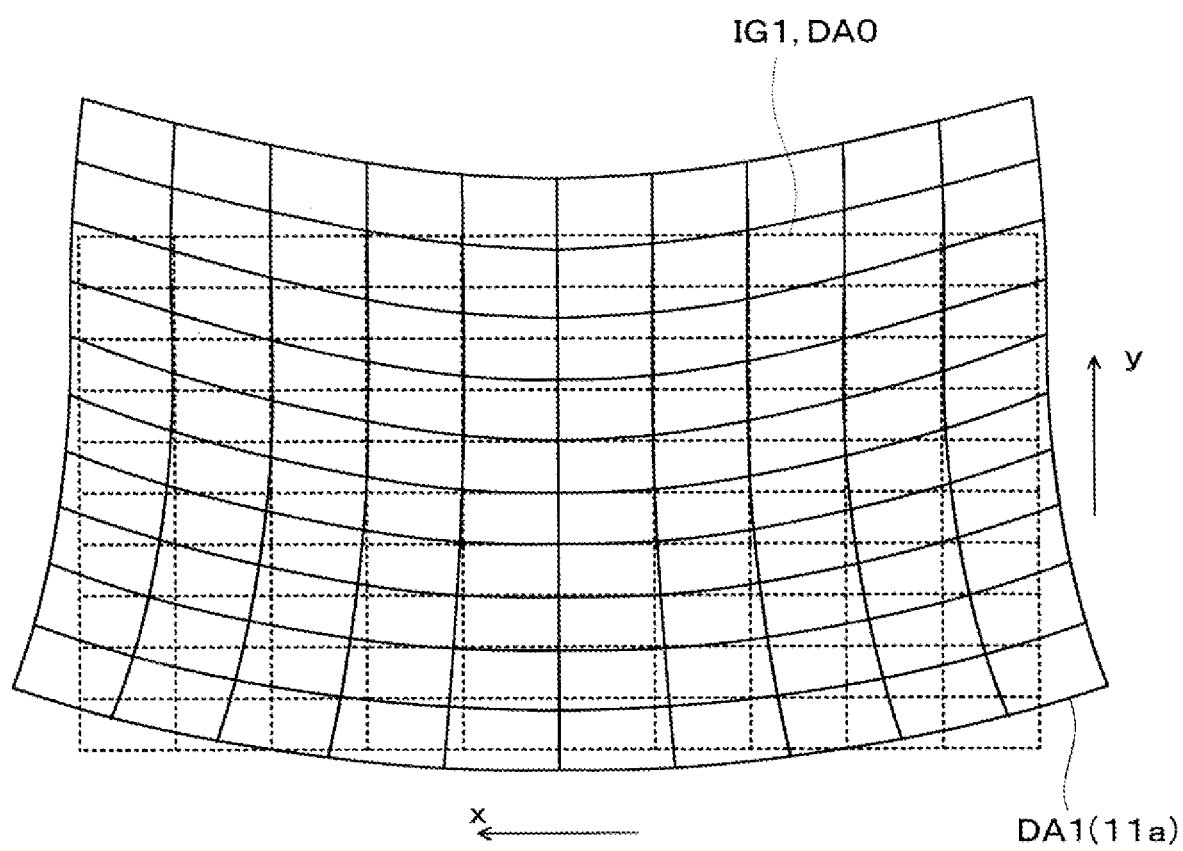
FIG. 5 is a diagram illustrating distortion correction of a display image.

As illustrated in FIG. 5, the display image formed at the display surface 11d of the first image element 11a is set to a modified image DA1 having a distortion such as trapezoidal distortion. That is, since the imaging optical system 20 is the off-axis optical system OS, it is not easy for the optical system itself to remove distortion such as trapezoidal distortion. In this way, a pixel array of a projected image IG1 of the virtual image observed at the pupil position PP via the imaging optical system 20 can be made into a grid pattern corresponding to an original display image DA0, and the outline thereof can be made rectangular by causing the image displayed on the first image element 11a to have reverse distortion that cancels out the distortion formed by the projection lens 21, the prism mirror 22, the wedge type optical element 28, and the see-through mirror 23. In other words, the first image element 11a corrects the distortion formed by the projection lens 21, the prism mirror 22, the wedge type optical element 28, and the see-through mirror 23. As a result, aberrations can be suppressed as a whole including the first image element 11a while allowing the distortion generated by the see-through mirror 23, etc. Thus, the degree of freedom in the arrangement and size of optical elements such as the prism mirror 22 is increased, and it is possible to easily secure the optical performance of the first display device 100a while achieving miniaturization of the first display device 100a.

Hereinafter, the positioning and fixing between elements such as the prism mirror 22, the barrel 31, and the projection lens 21 that constitute the first optical system 12a or the optical block OB illustrated in FIG. 3 will be described.

Figure 6:
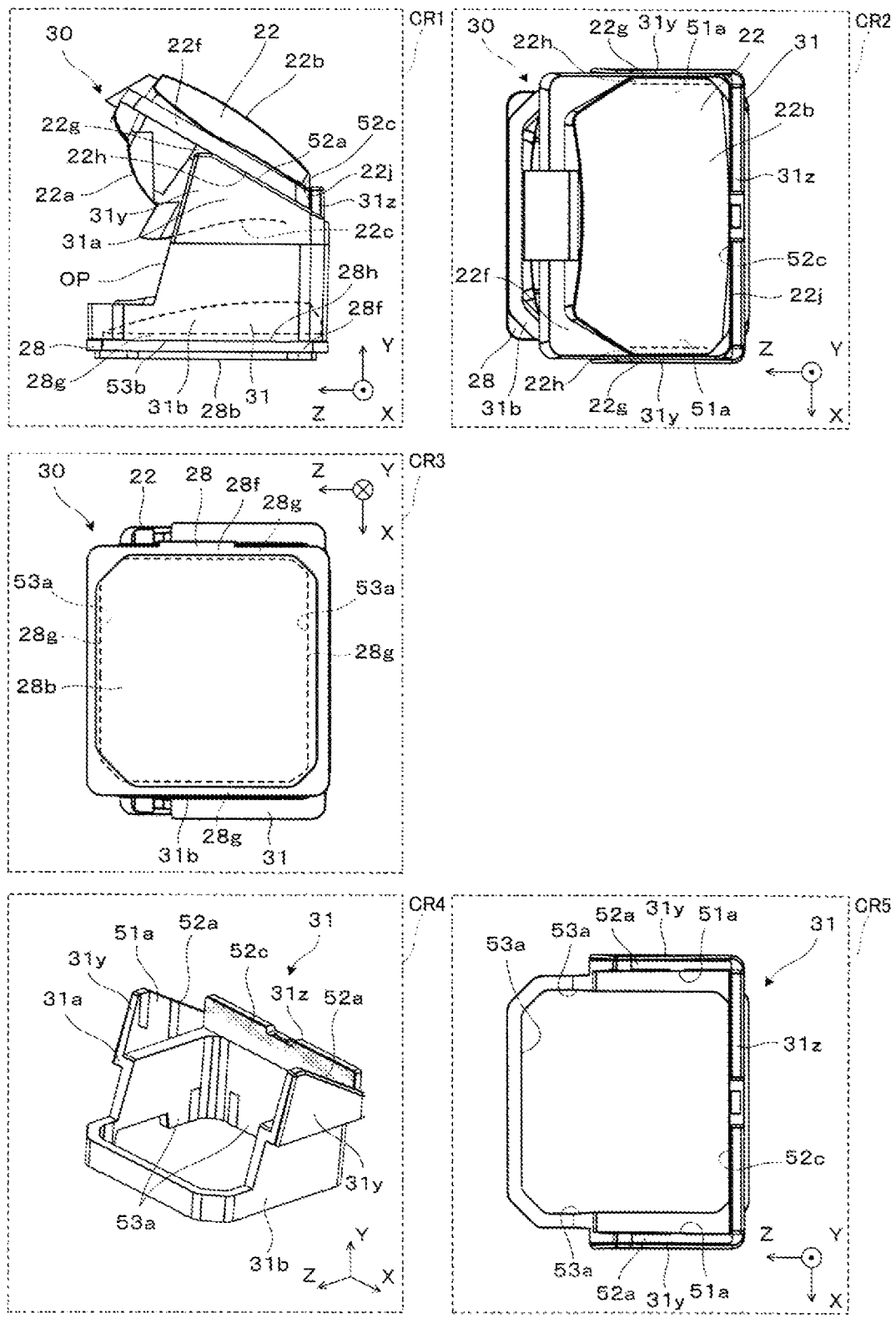
FIG. 6 is a diagram illustrating fixing of a prism mirror and a wedge type optical element with respect to a barrel.

With reference to FIG. 6, the fixing of the prism mirror 22 relative to the barrel 31 will be described. In FIG. 6, a region CR1 is a side view of an optical block main body 30 integrated by the barrel 31, a region CR2 is a top view of the optical block main body 30, a region CR3 is a bottom view of the optical block main body 30, a region CR4 is a perspective view of the barrel 31, and a region CR5 is a top view of the barrel 31. The prism mirror 22 is directly fixed relative to the barrel 31. At this time, the prism mirror 22 is fixed with respect to the barrel 31 with the prism mirror 22 positioned using the fitting and the one-sided alignment. Specifically, a pair of convex plates 31y formed at an upper end portion 31a of the barrel 31 and extending in parallel, and a restriction plate 31z extending so as to pass between the pair of convex plates 31y, sandwich a stepped side surface 22g of a flange portion 22f between the pair of convex plates 31y while supporting the flange portion 22f in a tilted state. At this time, an inner surface 51a of the pair of convex plates 31y and the step side surface 22g of the flange portion 22f mate with each other, and one-sided alignment is performed in which a reference surface 52a provided at the pair of convex plates 31y and the lower surface 22h of the flange portion 22f are abutted against each other, and one-sided alignment is performed in which the reference surface 52c provided on the inner side of the restriction plate 31z and the side surface 22j of the flange portion 22f are abutted against each other. As a result, the prism mirror 22 is positioned with respect to the barrel 31 with regard to the arrangement in the three axial directions (X, Y, and Z directions) and the rotational posture of the three axes. A photocurable adhesive, an ultrasonic welding method, etc. may be used for joining the prism mirror 22 and the barrel 31.

With respect to the optical block main body 30 described above, as illustrated in FIG. 4, the angle formed between the optical axis portion AX1 on the incident portion 22a side of the prism mirror 22 and the optical axis portion AX2 on the emission portion 22c side of the prism mirror 22 is 60° or less. The angle difference between the two is not very large, so the projection lens 21 has a structure close to the barrel 31. Thus, as illustrated in FIG. 6, an opening OP is provided in the barrel (support member) 31 on the incident portion 22a side of the prism mirror 22 so as to avoid interference with the projection lens 21.

The fixing of the wedge type optical element 28 with respect to the barrel 31 will be described. The wedge type optical element 28 is fixed directly to the barrel 31. At this time, the wedge type optical element 28 is fixed with respect to the barrel 31 in a state of being positioned using the fitting. Specifically, the lateral restriction surface 53a formed along the inner circumference of the four sides of a lower end portion 31b of the barrel 31 and a stepped side surface 28g of the flange portion 28f of the wedge type optical element 28 face each other, and the lower restriction surface 53b formed along the lower end of the four sides of the lower end portion 31b of the barrel 31 and the stepped upper surface 28h of the flange portion 28f of the wedge type optical element 28 face each other. As a result, the wedge type optical element 28 is positioned with respect to the barrel 31 with regard to the arrangement in the three axial direction and the rotational posture of the three axes. A photocurable adhesive, an ultrasonic welding method, etc. may be used for joining the wedge type optical element 28 and the barrel 31.

Figure 7:
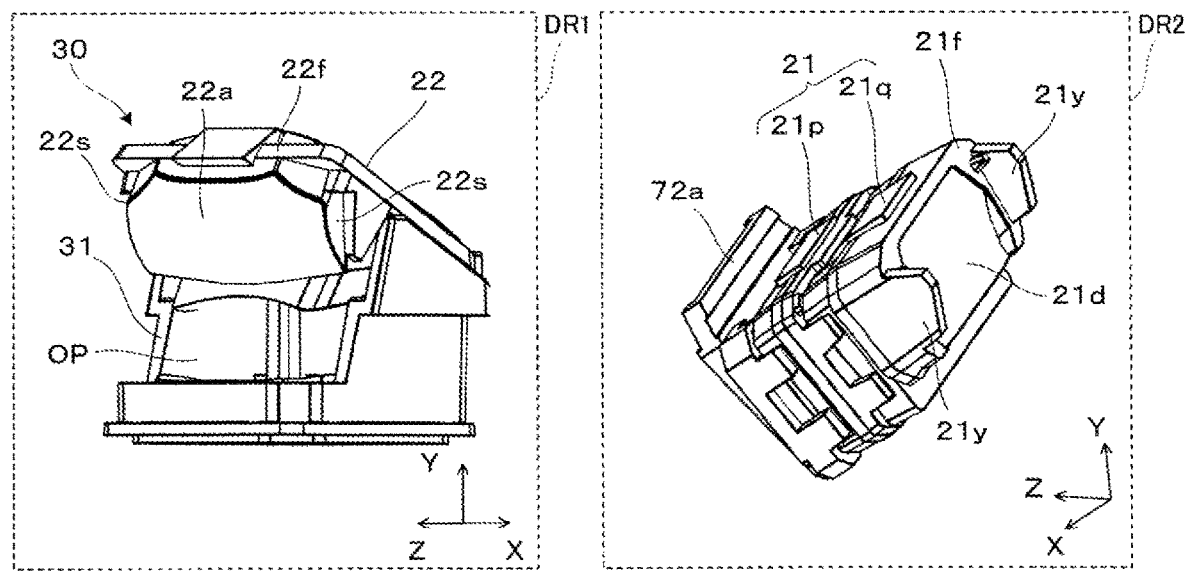
FIG. 7 is a diagram illustrating coupling between a prism mirror and a projection lens.

The fixing of the projection lens 21 with respect to the prism mirror 22 will be described with reference to FIG. 7. In FIG. 7, a region DR1 is a perspective view of the optical block main body 30 having the prism mirror 22, etc. attached to the barrel 31, and a region DR2 is a perspective view of the projection lens 21, etc. The projection lens 21 is directly fixed to the prism mirror 22 of the optical block main body 30. At this time, the projection lens 21 is fixed to the prism mirror 22 in a state of being positioned using the fitting the one-sided alignment. Specifically, a pair of claws 21y formed in a flange portion 21f of the second lens 21q that constitutes the projection lens 21 is inserted into a pair of recessed portions 22s so as to sandwich the pair of recessed portions 22s formed in a flange portion 22f of the prism mirror 22. As a result, the pair of claws 21y of the second lens 21q grip the flange portion 22f of the prism mirror 22. At this time, one-sided alignment is performed in which the pair of claws 21y mate with the pair of recessed portions 22s, and the reference surface provided at the pair of claws 21y and the reference surface provided at the pair of recessed portions 22s are abutted against each other. As a result, the second lens 21q or the projection lens 21 is positioned relative to the prism mirror 22 in relation to the three-axis arrangement and the three-axis rotational position. A photocurable adhesive, an ultrasonic welding method, etc. may be used for joining the second lens 21q and the prism mirror 22.

Figure 8:
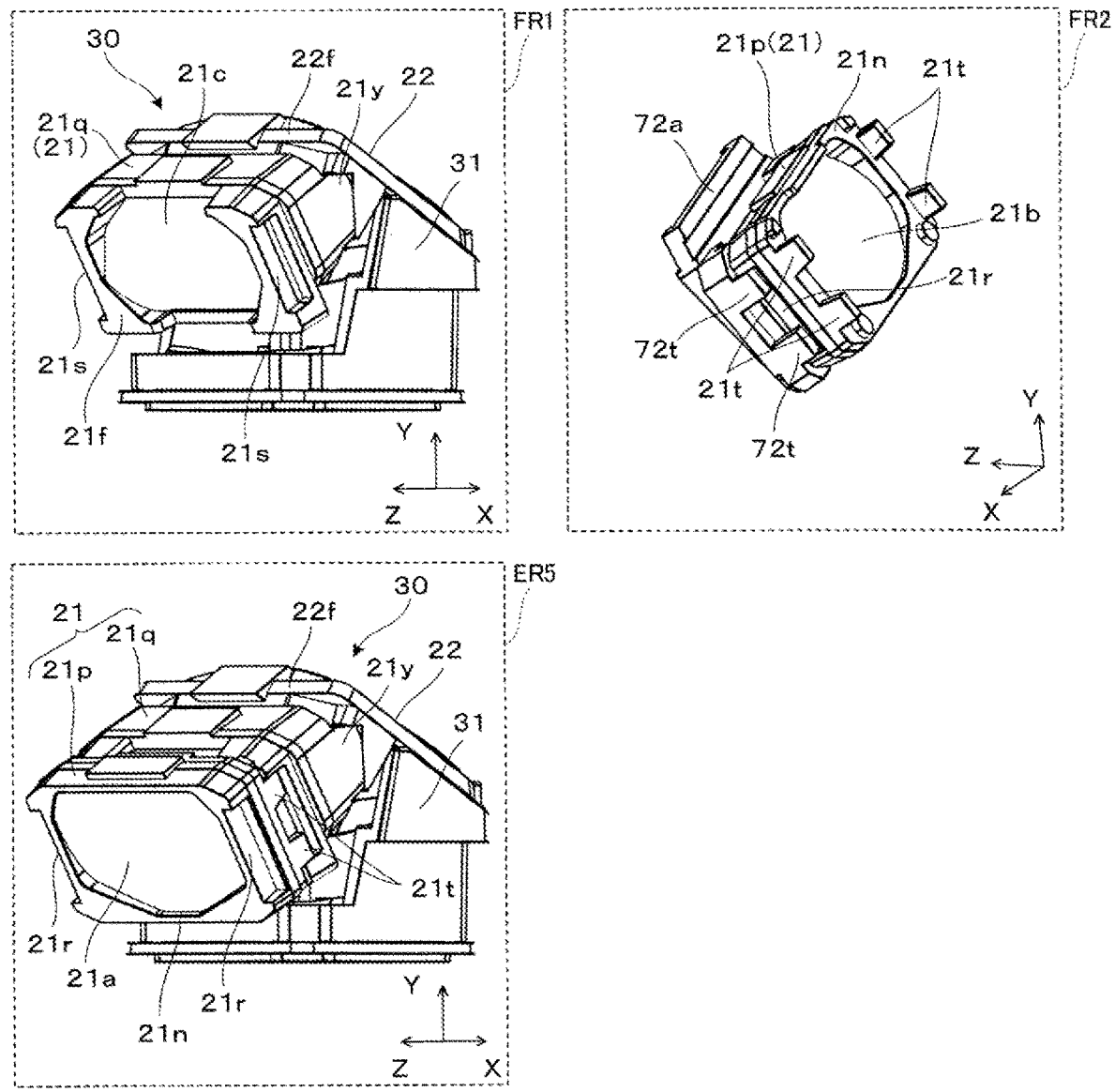
FIG. 8 is a diagram illustrating fixing between lenses in the projection lens.

The fixing of the first lens 21p and the second lens 21q in the projection lens 21 will be described with reference to FIG. 8. In FIG. 8, a region ER1 is a perspective view illustrating a state in which the first lens 21p is removed from the first optical system 12a, a region ER2 is a perspective view illustrating the first lens 21p, etc., and a region FR3 is a perspective view illustrating the first optical system 12a with the first holder 72a separated. The first lens 21p is fixed directly to the second lens 21q. At this time, the first lens 21p is fixed to the second lens 21q in a state of being positioned using the fitting. Specifically, a plurality of claws 21t formed in a flange portion 21n of the first lens 21p are inserted into the pair of recessed portions 21s so as to sandwich the pair of recessed portions 21s formed in the flange portion 21f of the second lens 21q. As a result, the plurality of claws 21t of the first lens 21p grip the flange portion 21f of the second lens 21q. At this time, the plurality of claws 21t mate with the pair of recessed portions 21s. As a result, the first lens 21p is positioned with respect to the second lens 21q with regard to the arrangement in the three axial direction and the rotational posture of the three axes. A photocurable adhesive, an ultrasonic welding method, etc. may be used for joining the first lens 21p and the second lens 21q.

The fixing of the first holder 72a with respect to the first lens 21p of the projection lens 21 will be described. Note that the first holder 72a holds the first image element 11a, and in the present specification, a combination of the first image element 11a and the first holder 72a is also referred to as an image element. The first holder 72a is fixed directly to the first lens 21p. At this time, the first holder 72a is fixed to the first lens 21p in a state of being positioned using the fitting. Specifically, a plurality of claws 72t formed in the first holder 72a are inserted into a pair of recessed portions 21r so as to sandwich the pair of recessed portions 21r formed in the flange portion 21n of the first lens 21p. As a result, the plurality of claws 72t of the first holder 72a grip the flange portion 21n of the first lens 21p. At this time, the plurality of claws 72t mate with the pair of recessed portions 21r. As a result, the first holder 72a is positioned with respect to the first lens 21p with regard to the arrangement in the three axial direction and the rotational posture of the three axes. A photocurable adhesive, an ultrasonic welding method, etc. may be used for joining the first holder 72a and the first lens 21p.

As described above, the prism mirror 22 and the projection lens 21 that constitute the optical block OB are directly fixed by a mutually positioned structure, and do not include a common member such as a mirror frame or a case. Therefore, the assembly accuracy between the necessary members (specifically, between the prism mirror 22 and the projection lens 21) can be increased while reducing the size of the optical block OB. On the other hand, as illustrated in FIG. 3, due to the positioned structure, a gap G11 is formed at a pair of side surfaces in the horizontal X direction, and a gap G12 is formed at a pair of side surfaces in the vertical Y direction, between the prism mirror 22 and the second lens 21q. Further, a gap G21 is formed at a pair of side surfaces in the horizontal X direction, and a gap G22 is formed at a pair of side surfaces in the vertical Y direction, between the second lens 21q and the first lens 21p. A gap G31 is formed at a pair of side surfaces in the horizontal X direction, and a gap G32 is formed at a pair of side surfaces in the vertical Y direction, between the first lens 21p and the first holder 72a. Note that the gaps G31, G32 between the first lens 21p and the first holder 72a result in gaps between the first lens 21p and the first image element 11a.

Figure 9:
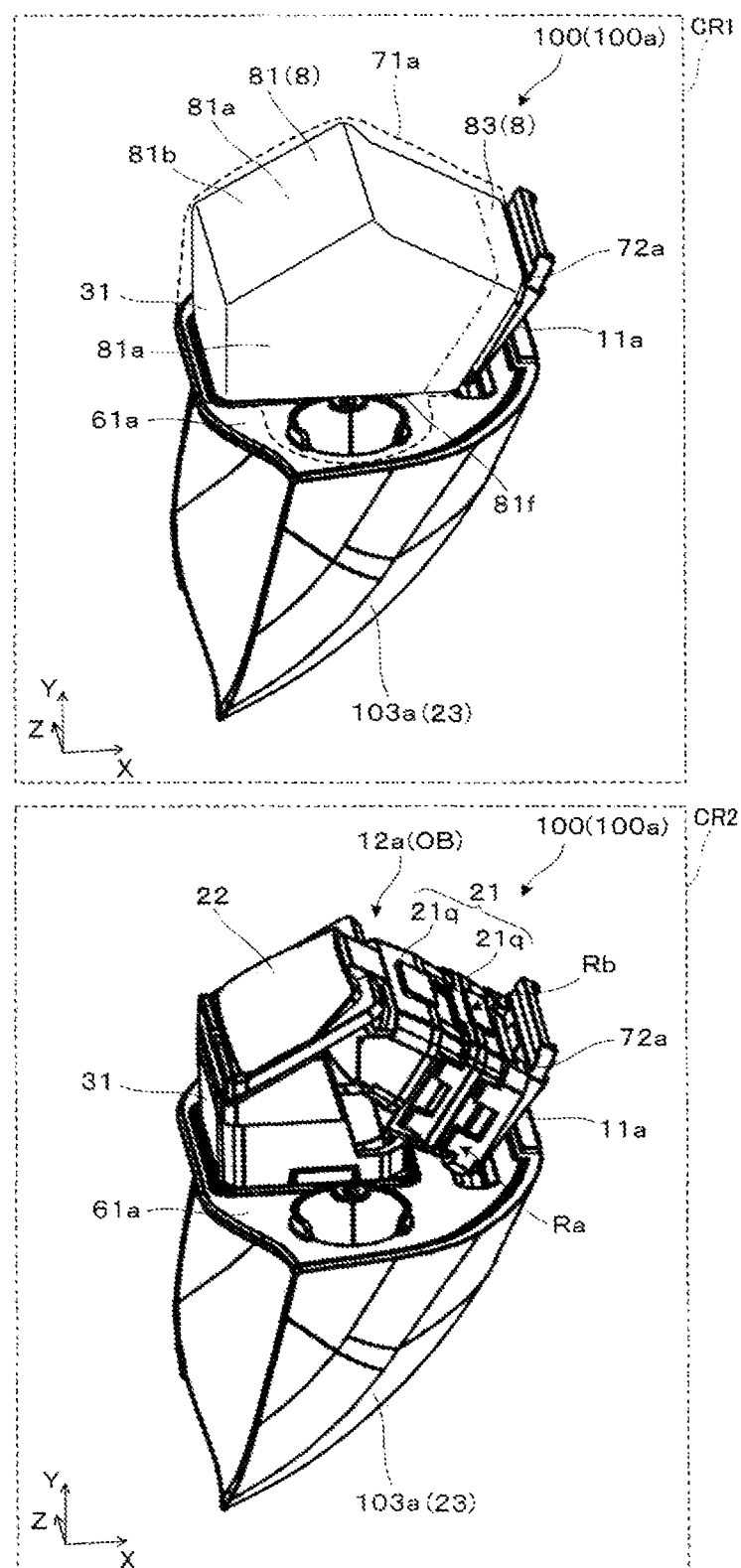
FIG. 9 is a perspective view illustrating a state in which an optical block is covered with a first dust proof member, etc.
Figure 10:
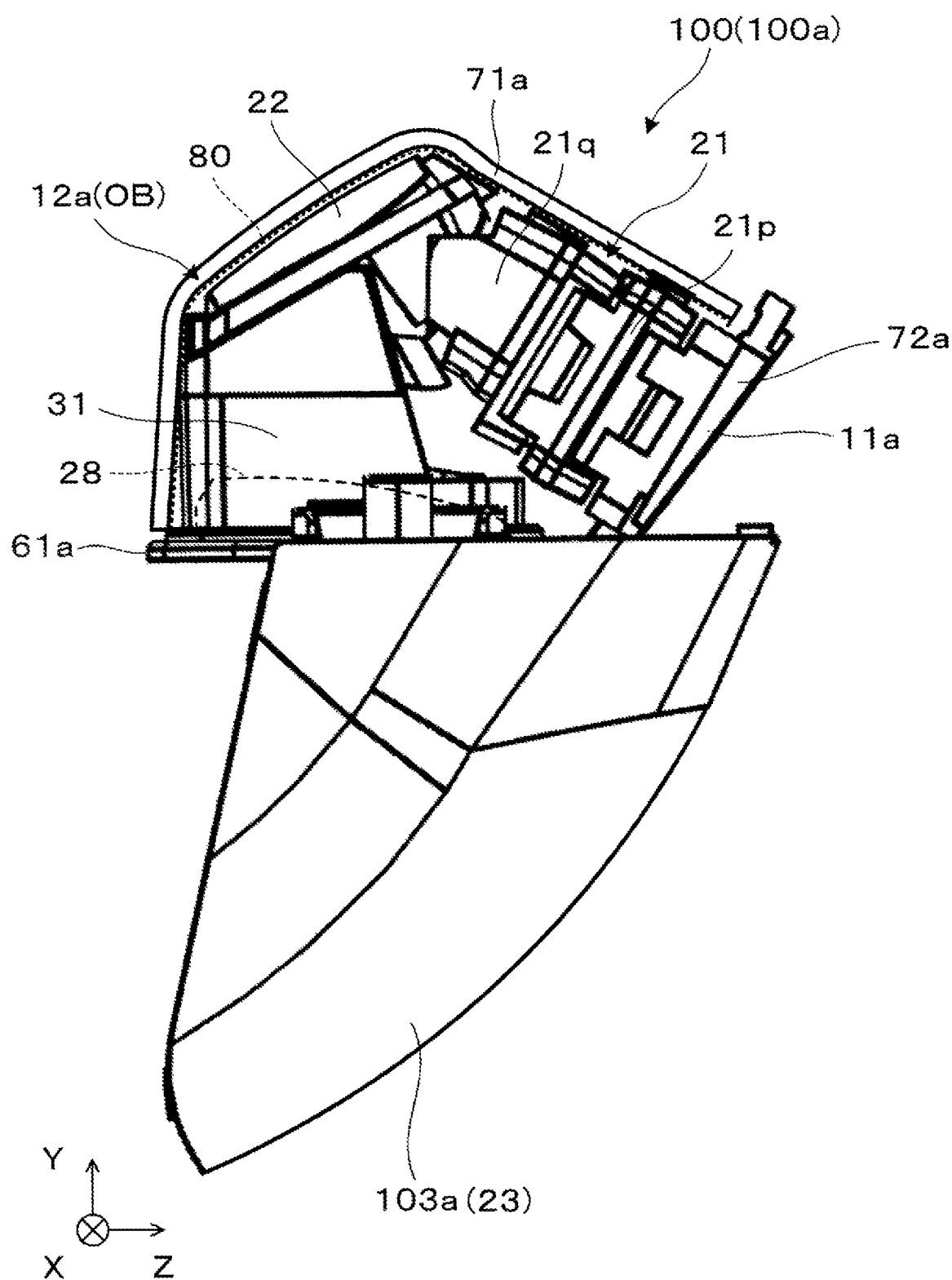
FIG. 10 is a side cross-sectional view illustrating a state in which a cover member is attached.

Referring to FIGS. 9 and 10, the optical block OB is covered around by a dust proof cover 80, and the dust proof cover 80 is covered around by the first cover member 71a. The dust proof cover 80 includes a first dust proof member 81 and a third dust proof member 83.

The first dust proof member 81 has a pair of side surface portions 81a and an upper surface portion 81b. The side surface portion 81a covers a both end region Ra (specifically see FIG. 3) of the projection lens 21, the prism mirror 22, and the barrel 31 in a third axis parallel to the X-axis, and the upper surface portion 81b covers an end region Rb (specifically see FIG. 3) of the projection lens 21 and the prism mirror 22 located on the upper side of the second axis parallel to the Z-axis. Here, when an axis along which the projection lens 21 and the prism mirror 22 are aligned is a first axis and an axis along which the prism mirror 22 and the wedge type optical element 28 are aligned is a second axis, the third axis with respect to the both end region Ra is an axis orthogonal to the first axis and the second axis, and is parallel to the X-axis extending laterally as described above. The first axis along which the projection lens 21 and the prism mirror 22 are aligned corresponds to the optical path P1 or the optical axis portion AX1 with reference to FIG. 4, and the second axis along which the prism mirror 22 and the wedge type optical element 28 are aligned corresponds to the optical path P2 or the optical axis portion AX2 with reference to FIG. 4. Moreover, the position on the upper side of the second axis means that the position is not on the lower wedge type optical element 28 side in the second axis or the optical axis portion AX2, but on the upper prism mirror 22 side.

The first dust proof member 81 covers the gaps G11, G12 (see FIG. 3) between the prism mirror 22 and the second lens 21q, and covers the gaps G21, G22 (see FIG. 3) between the second lens 21q and the first lens 21p. The first dust proof member 81 extends to the vicinity of the first frame 61a, and the lower end 81f of the first dust proof member 81 abuts the upper surface of the first frame 61a. As a result, the first dust proof member 81 also covers the opening OP formed at the barrel 31.

The first dust proof member 81 is a sheet-shaped, elastic dust proof tape 8, and deforms so as to conform to the side shape of the projection lens 21, the prism mirror 22, and the barrel 31. By configuring the first dust proof member 81 to be the dust proof tape 8, the dust proof cover 80 can be made lighter.

Figure 11A:
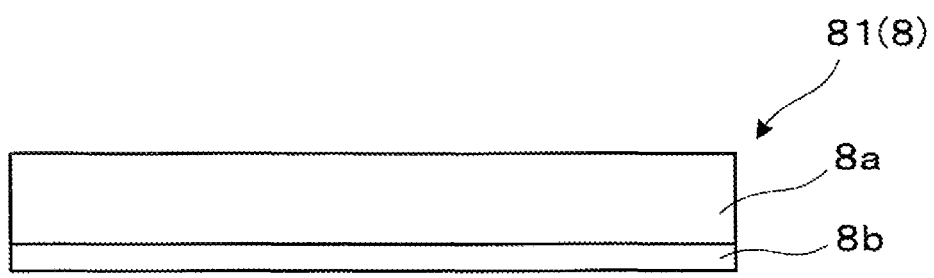
FIG. 11A is a conceptual diagram illustrating a cross-sectional structure of the first dust proof member.

As illustrated in FIG. 11A, the dust proof tape 8, which is the first dust proof member 81, is formed with an adhesive layer 8b on the inner side of a substrate 8a having light absorptivity. The substrate 8a of the dust proof tape 8 is formed of, for example, aluminum glass tape, aluminum tape, etc., and has not only light absorptivity but also a thermal insulating property. Note that the adhesive layer 8b does not need to be formed throughout the entire substrate 8a, and can be locally formed at, for example, the outer periphery of the first dust proof member 81 and the inner position. Furthermore, it is not necessary to have light absorptivity throughout the substrate 8a, but it is sufficient to have light absorptivity in a location covering the gaps G11, G12, G21, G22, etc.

Figure 11B:
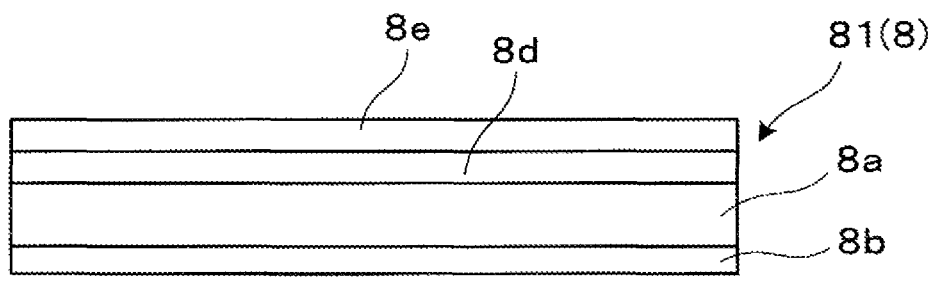
FIG. 11B is a conceptual drawing illustrating a modification example of a cross-sectional structure of the first dust proof member.

As illustrated in FIG. 11B, the dust proof tape 8 of the modification example has a heat shielding layer 8d formed at the surface of the substrate 8a and a thermally conductive layer 8e formed at the surface of the heat shielding layer 8d. The heat shielding layer 8d is a fibrous layer containing air, and is formed from a material such as glass fibers or carbon fibers, for example, and is applied, deposited, or affixed to the substrate 8a. The thermally conductive layer 8e is a thermally conductive layer, and is formed from a material such as aluminum, silver, etc.

Returning to FIG. 9, the third dust proof member 83 covers an end region corresponding to an upper surface of the first holder 72a to the first lens 21p, and a both end region corresponding to the pair of side surfaces. The third dust proof member 83 covers a portion between the first holder 72a and the first lens 21p and, as a result, covers a portion between the first image element 11a and the first lens 21p. In other words, the third dust proof member 83 covers the gaps G31, G32 (see FIG. 3) between the first holder 72a and the first lens 21p. The third dust proof member 83 may be separate from the first dust proof member 81, but may be integral with the first dust proof member 81.

Figure 12:
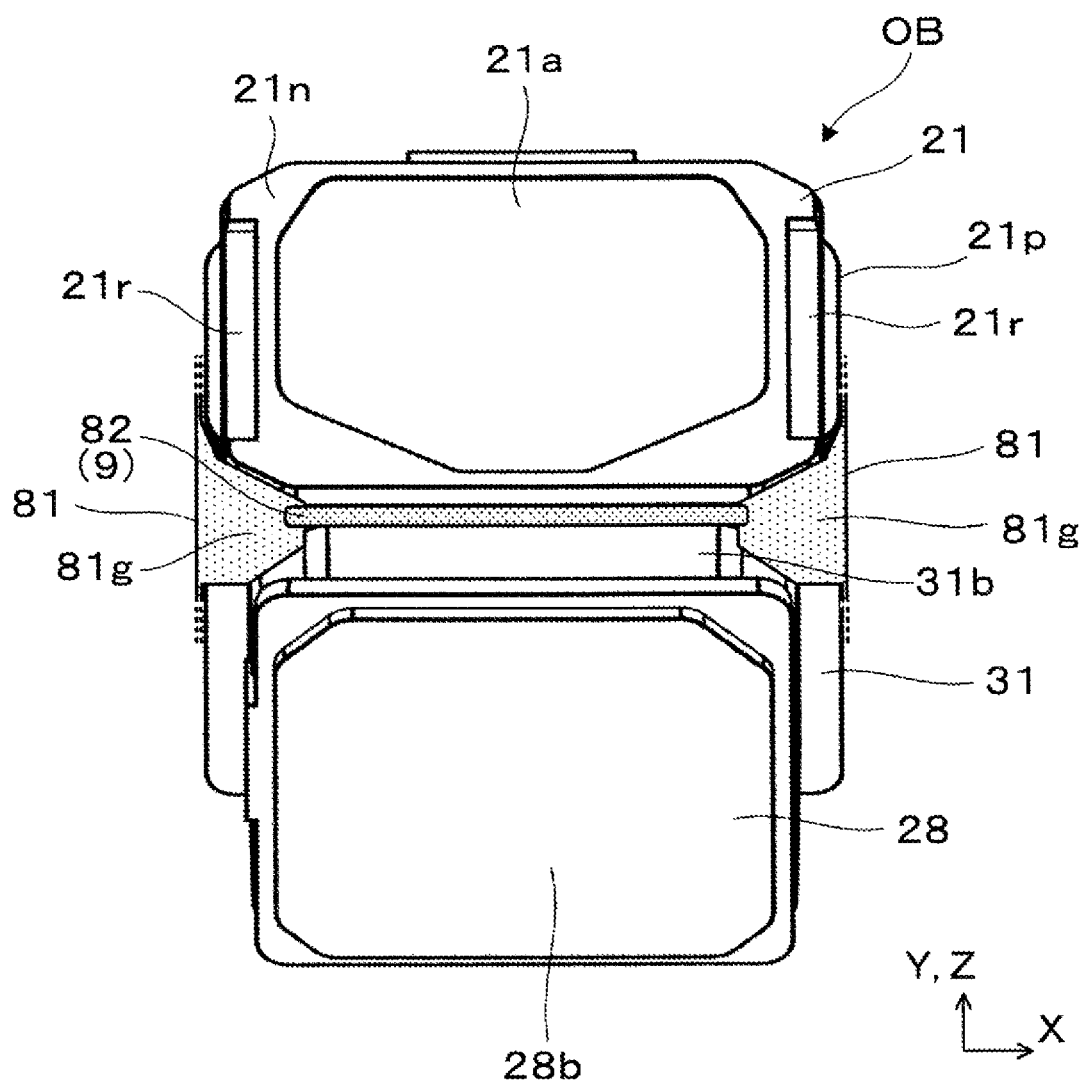
FIG. 12 is a diagram illustrating a second dust proof member.

As illustrated in FIG. 12, a second dust proof member 82 that forms a portion of the dust proof cover 80 is provided between the projection lens 21, which is the first optical member, and the barrel 31, which is the support member. A gap G4 (see FIG. 3) is formed between the lower end of the projection lens 21 and the lower end portion 31b of the barrel 31. The gap G4 remains open even when the periphery of the optical block OB is covered by the first dust proof member 81, and thus the gap G4 is covered by the second dust proof member 82. The inside of the optical block OB is substantially sealed by the first dust proof member 81 and the second dust proof member 82, and dust-proofing of the optical block OB is achieved. In addition, when a portion 81g of the first dust proof member 81 is wound between the lower end of the projection lens 21 and the lower end portion 31b of the barrel 31, the dust dust-proofing is further enhanced.

The second dust proof member 82 is formed by an adhesive layer 9. The second dust proof member 82 formed from the adhesive layer 9 is obtained by supplying a highly viscous filling resin to fill the front side of the gap G4 so as to couple the lower end of the projection lens 21 and the lower end portion 31b of the barrel 31, and then curing the filling resin with heat or light. The second dust proof member 82 or the adhesive layer 9 has elasticity after adhesion or after curing, and is deformable. The adhesive layer 9 is not limited to being sheet-shaped, and may be a bulk having a thickness. Note that the second dust proof member 82 or the adhesive layer 9 can be replaced with one corresponding to the dust proof tape 8 of the first dust proof member 81.

Figure 13:
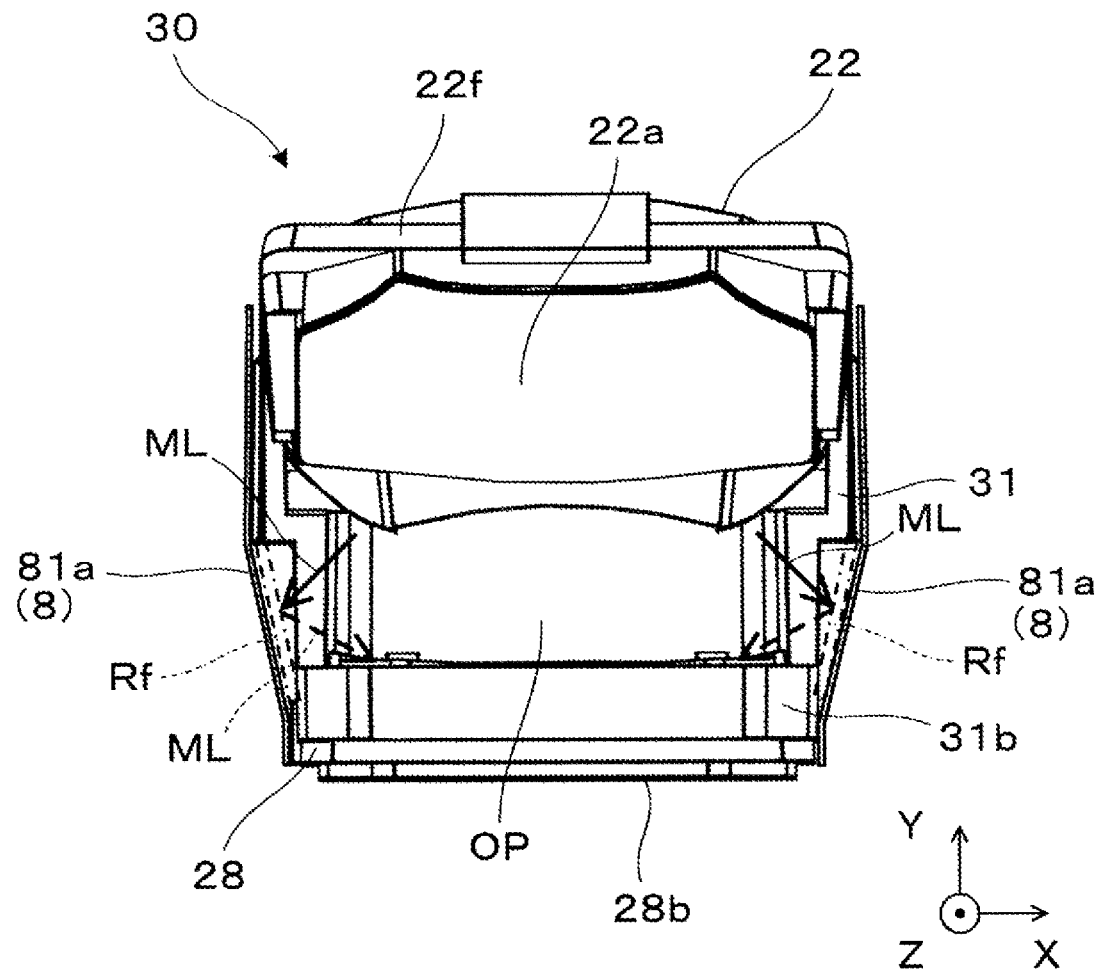
FIG. 13 is a diagram illustrating stray light prevention by the first dust proof member.

With reference to FIG. 13, functions of the first dust proof member 81 in the open region in the lateral direction of the optical block OB will be described. The optical block OB has a lateral region Rf of the opening OP that is open, and the first dust proof member 81 closes this lateral region Rf. The first dust proof member 81 is disposed in the lateral region Rf, and the image light ML from the prism mirror 22 may be incident on the inner surface of the first dust proof member 81. Since the first dust proof member 81 has light absorptivity and can prevent or reduce reflection, stray light can be prevented from occurring while dust-proofing optical elements within the optical block OB can be achieved. In the above, the stray light prevention in the vicinity of the opening OP has been described, but even in a case where there is an opening between the lenses constituting the projection lens 21 and stray light may occur, the generation of stray light can be suppressed by the first dust proof member 81.

Figure 14:
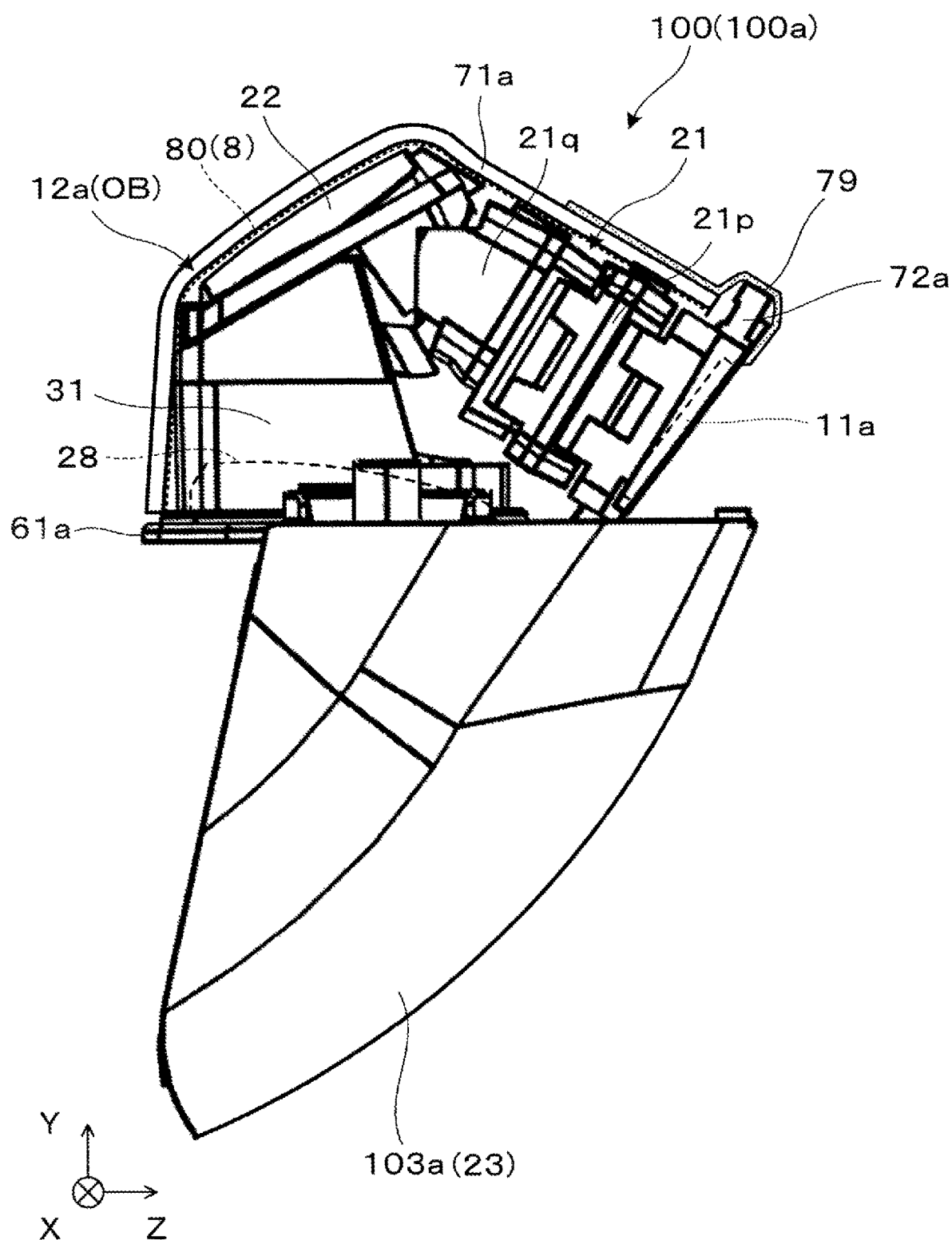
FIG. 14 is a diagram illustrating a modification example in which a heat dissipation sheet is added.

FIG. 14 is a side, partial cross-sectional view illustrating the optical module 100 of a modification example. In this case, a heat dissipation sheet 88 is extended from the upper end of the first image element 11a fixed to the first holder 72a, and is applied to the upper surface of the first cover member 71a. The heat dissipation sheet 88 has a role of allowing heat generated by the first image element 11a to escape to the outside of the first cover member 71a. Here, the dust proof cover 80 that is disposed inside the first cover member 71a and covers the optical block OB is the dust proof tape 8 having a thermal insulation effect, prevents thermal conduction from the first cover member 71a or radiant heat from warming the optical block OB within the dust proof cover 80, and prevents degradation in optical performance due to effects of temperature drift.

Figure 15:
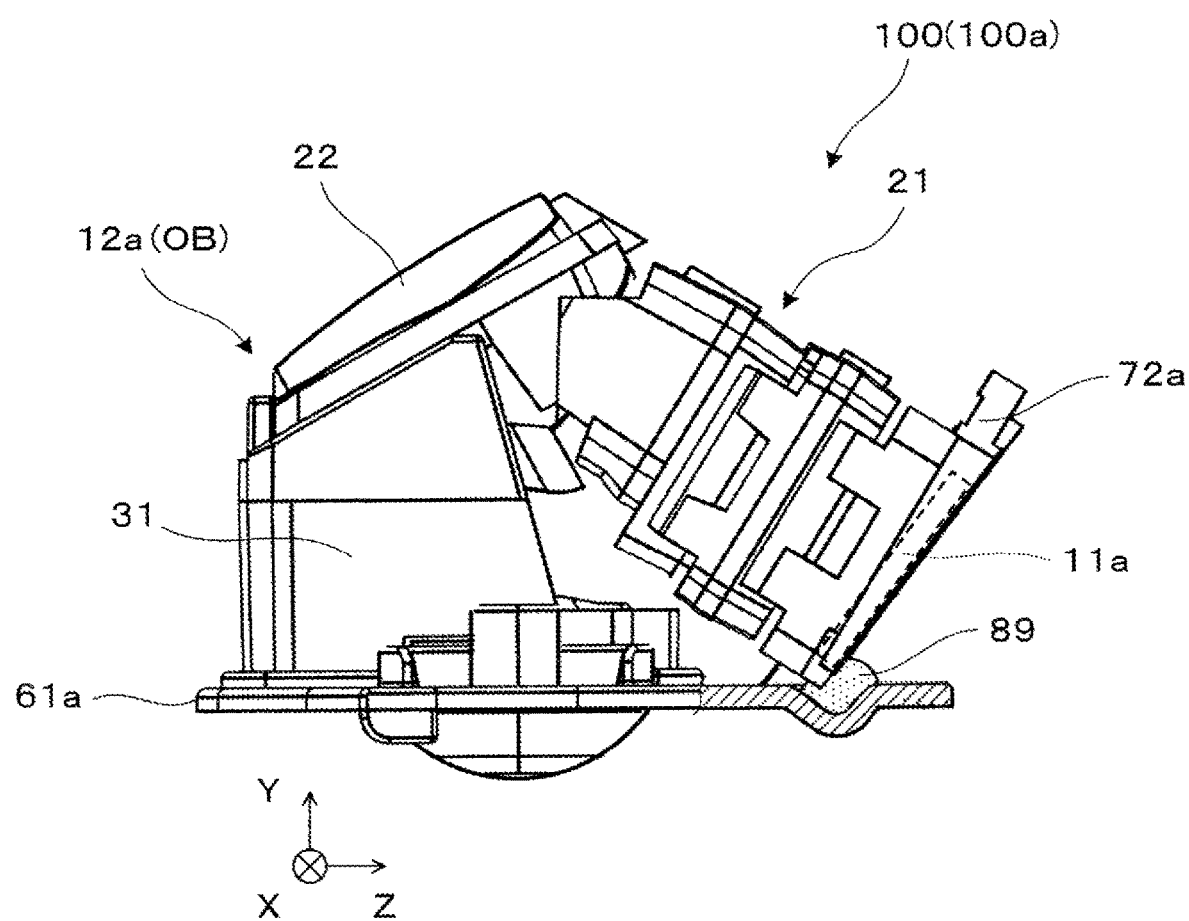
FIG. 15 is a diagram illustrating a modification example of heat-dissipating the image element.

FIG. 15 is a diagram illustrating the optical module 100 of the modification example. In this case, an adhesive layer 89 having thermal conductivity is formed between the lower end of the first image element 11a fixed to the first holder 72a and the first frame 61a, and fills the gap formed therebetween. A groove 61g is formed in the first frame 61a at a location opposite the lower end of the first image element 11a. The adhesive is filled so as to fill the groove 61g, and the adhesive is supplied until the lower end of the first image element 11a comes into contact. Thereafter, the adhesive is cured to form the adhesive layer 89. The adhesive layer 89 is maintained in a state of elasticity after curing. The adhesive layer 89 is a layer in which a light absorbing material such as carbon is kneaded, and is, for example, a UV adhesive layer, a heat curing adhesive, etc.

The HMD 201 or the optical module 100 according to the exemplary embodiment described above includes the image element 11a configured to emit the image light ML, the projection lens 21 including the first incident portion 21a on which the image light ML is incident and the first emission portion 21d configured to emit the image light ML, the prism mirror 22 including the second incident portion 22a on which the image light ML emitted from the projection lens 21 in the first direction is incident, the reflection portion 22b configured to reflect the incident image light ML in the second direction intersecting the first direction, and the second emission portion 22c configured to emit the image light ML reflected by the reflection portion 22b, the wedge type optical element 28 including the third incident portion 38a on which the image light ML emitted from the prism mirror 22 is incident and the third emission portion 28b configured to emit the image light ML, the barrel 31 that configured to support the prism mirror 22 and the wedge type optical element 28, the first combiner 103a configured to deflect the image light ML emitted from the wedge type optical element 28 to form the exit pupil, the first dust proof member 81 configured to cover the both end region of the projection lens 21, the prism mirror 22, and the barrel 31 in the third axis, and the end region of the projection lens 21 and the prism mirror 22 located on the prism mirror 22 side in the second axis, and the second dust proof member 82 provided between the projection lens 21 and the barrel 31.

In the optical module described above, the first dust proof member 81 covers the both end region of the projection lens 21, the prism mirror 22, and the barrel 31 in the third axis, and the end region of the projection lens 21 and the prism mirror 22 located on the prism mirror 22 side in the second axis, and the second dust proof member 82 is provided between the projection lens 21 and the barrel 31, therefore, dust-proofing can be achieved by covering the projection lens 21 and the prism mirror 22 without providing a case, and the optical block OB including the projection lens 21, the prism mirror 22, etc. can be miniaturized.

Modification Examples and Others

The present disclosure is described according to the above-described embodiments, but the present disclosure is not limited to the above-described embodiments. The present disclosure may be carried out in various modes without departing from the gist of the present disclosure, and, for example, the following modifications may be carried out.

The imaging optical system 20 incorporated into the first display device 100a is not limited to that illustrated, and may have various configurations. Specifically, the imaging optical system 20 described above is the off-axis optical system OS that is asymmetric in the Y direction or the longitudinal direction, but may also be an off-axis optical system that is asymmetric in the X direction or the horizontal direction. The optical elements constituting the imaging optical system 20 are merely exemplary in FIG. 4, and changes can be made, such as increasing or decreasing the number of lenses, adding a mirror, and adding a light-guiding member, etc.

A light control device that controls light by limiting the transmitted light of the combiners 103a, 103b can be attached on an external side of the combiners 103a, 103b. The light control device adjusts a transmittance, for example, electrically. Mirror liquid crystals, electronic shades, and the like may be used as the light control device. The light control device may adjust a transmittance according to outside light brightness.

The combiner 103a, 103b may be replaced with a mirror having light blocking properties. In this case, the optical system is a non-see-through type optical system that does not assume direct observation of an outside image.

In a specific aspect, an optical module includes an image element configured to emit image light, a first optical member including a first incident portion on which the image light is incident and a first emission portion configured to emit the image light, a second optical member including a second incident portion on which the image light emitted from the first optical member in the first direction is incident, a reflection portion configured to reflect the image light in a second direction intersecting the first direction, and a second emission portion configured to emit the image light reflected by the reflection portion, a third optical member including a third incident portion on which the image light emitted from the second optical member is incident and a third emission portion configured to emit the image light, a support member configured to support the second optical member and the third optical member, a combiner configured to deflect the image light emitted from the third optical member to form an exit pupil, a first dust proof member configured to, when an axis along which the first optical member and the second optical member are aligned is defined as a first axis and an axis along which the second optical member and the third optical member are aligned is defined as a second axis, cover a both end region of the first optical member, the second optical member, and the support member in the third axis orthogonal to the first axis and the second axis, and an end region between the first optical member and the second optical member in the second axis, and a second dust proof member provided between the first optical member and the support member.

In the optical module, the first dust proof member covers the both end region of the first optical member, the second optical member, and the support member in the third axis, and the end region of the first optical member and the second optical member located on the second optical member side of the second axis, and the second dust proof member is provided between the first optical member and the support member, therefore, dust-proofing can be achieved by covering the first optical member and the second optical member without providing a case, and an optical block including the first optical member, the second optical member, etc. can be miniaturized.

In a specific aspect, the first dust proof member is a dust proof tape. In this case, the first dust proof member can be made lighter, and the dust proof structure can be made lighter.

In a specific aspect, the first dust proof member has a thermal insulating property. In this case, it is possible to suppress the inflow of heat into the inner side of the first dust proof member, and it is possible to stabilize the optical characteristics of the optical block including the first optical member, the second optical member, etc.

In a specific aspect, the second dust proof member is an adhesive layer or a dust proof tape. In this case, the second dust proof member can be made lighter. In particular, when the second dust proof member is used as the adhesive layer, dust proof treatment is easily performed at a narrow entry site.

In a specific aspect, the support member is disposed between the second optical member and the third optical member, and includes an opening on the first optical member side, and the first dust proof member has light absorptivity and cofigured to cover the opening. In this case, the dust proof tape also functions as a light shield, and the generation of stray light can be suppressed.

In a specific aspect, a frame configured to support the support member is further provided, wherein the first dust proof member extends to the frame. In this case, the structure can be configured to accommodate the optical block between the first dust proof member and the frame.

In a specific aspect, a thermally conductive adhesive layer is filled between the image element and the frame when viewed from a direction parallel with the third axis. In this case, the gap between the image element and the frame can be closed, and heat flow from the image element to the frame can be formed while dust-proofing is being performed, and heat dissipation of the image element can be made efficient.

In a specific aspect, a cover member configured to cover the first dust proof member is further provided. The cover member does not interfere with the optical block and has a role of protecting the optical block from thermal or mechanical shocks.

In a specific aspect, a gap is formed between the first optical member and the second optical member, and the first dust proof member is configured to cover the first optical member and the second optical member and the gap.

In a specific aspect, a third dust proof member configured to cover a portion between the image element and the first optical member is further provided. As a result, dust-proofing is achieved between the optical block and the image element, and the dust-proofing of the optical block is ensured.

In a specific aspect, a head-mounted display device includes the above-mentioned optical module and a control device for causing the image element to perform display operation.

What is claimed is:

1. An optical module comprising:
    an image element that emits an image light;
    a first optical member that includes:
        a first incident portion on which the image light is incident, and
        a first emission portion that emits the image light along a first direction;
    a second optical member that includes:
        a second incident portion on which the image light from the first optical member is incident,
        a second emission portion that emits the image light along a second direction intersecting the first direction, and
        a reflection portion that reflects the image light from the second incident portion toward the second emission portion;
    a third optical member that includes:
        a third incident portion on which the image light from the second optical member is incident, and
        a third emission portion that emits the image light;
    a support member that supports the second optical member and the third optical member;
    a combiner that reflects the image light from the third optical member toward a position of a pupil;
    a first dust proof member that covers a region of the first optical member, a region of the second optical member, and a region of the support member in a third direction intersecting the first direction and the second direction, and covers a region of the first optical member and a region of the second optical member in the second direction; and
    a second dust proof member provided between the first optical member and the support member.

2. The optical module according to claim 1, wherein the first dust proof member is a dust proof tape.

3. The optical module according to claim 1, wherein the first dust proof member has a thermal insulating property.

4. The optical module according to claim 1, wherein the second dust proof member is an adhesive layer or a dust proof tape.

5. The optical module according to claim 1, wherein the support member is disposed between the second optical member and the third optical member, and includes an opening on the first optical member side, and
    the first dust proof member has light absorptivity and configured to cover the opening.

6. The optical module according to claim 1, comprising a frame configured to support the support member, wherein the first dust proof member extends to the frame.

7. The optical module according to claim 6, wherein a thermally conductive adhesive layer is filled between the image element and the frame when viewed from the third direction.

8. The optical module according to claim 1, comprising a cover member configured to cover the first dust proof member.

9. The optical module according to claim 1, wherein a gap is formed between the first optical member and the second optical member, and
    the first dust proof member is configured to cover the first optical member, the second optical member, and the gap.

10. The optical module according to claim 1, further comprising a third dust proof member configured to cover a portion between the image element and the first optical member.

11. A head-mounted display device comprising:
    the optical module according to claim 1; and
    a control device configured to control display operation of the image element.

* * * * *